US009184880B2

(12) United States Patent
Vos

(10) Patent No.: US 9,184,880 B2
(45) Date of Patent: Nov. 10, 2015

(54) METHOD AND DEVICE ENABLING A DYNAMIC BUNDLE SIZE HARQ MECHANISM

(71) Applicant: Sierra Wireless, Inc., Richmond, British Columbia (CA)

(72) Inventor: Gustav Gerald Vos, Surrey (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 53 days.

(21) Appl. No.: 13/957,009

(22) Filed: Aug. 1, 2013

(65) Prior Publication Data

US 2015/0039958 A1   Feb. 5, 2015

(51) Int. Cl.
*G08C 25/02* (2006.01)
*H04L 1/18* (2006.01)

(52) U.S. Cl.
CPC ............ *H04L 1/1864* (2013.01); *H04L 1/1819* (2013.01); *H04L 1/1825* (2013.01)

(58) Field of Classification Search
CPC .......... H04W 76/048; H04W 72/0446; H04W 72/0413; H04L 1/1822; H04L 1/1887; H04L 1/1678
See application file for complete search history.

(56) References Cited

U.S. PATENT DOCUMENTS

| | | | |
|---|---|---|---|
| 2010/0098006 A1* | 4/2010 | Golitschek Edler Von Elbwart et al. | 370/329 |
| 2012/0093127 A1* | 4/2012 | Suzuki | 370/331 |
| 2014/0362832 A1* | 12/2014 | Rudolf et al. | 370/336 |

FOREIGN PATENT DOCUMENTS

| | | |
|---|---|---|
| CN | 103546253 | 1/2014 |
| KR | 10-2012-0061504 | 6/2012 |
| WO | WO 2009/132169 | 10/2009 |
| WO | WO 2009/157729 | 12/2009 |
| WO | WO 2010/006008 | 1/2010 |
| WO | WO 2013/169164 | 11/2013 |

OTHER PUBLICATIONS

Susitaival, R. et al., "LTE coverage Improvement by TTI Bundling," 2009 IEEE.
3GPP TSG-RAN WG2 #58bis Tdoc R2-072630 "HARQ Operation in Case of UL Power Limitation," Ericsson, Jun. 25-29, 2007, Orlando, USA.

(Continued)

*Primary Examiner* — Guerrier Merant
(74) *Attorney, Agent, or Firm* — Vedder Price, P.C.; Thomas J. Kowalski; Rebecca G. Rudich

(57) ABSTRACT

A method, device and computer program product for transmitting data blocks in an LTE or similar wireless communication system supporting HARQ and TTI bundling, with dynamic TTI bundle sizing is provided. Each TTI bundle includes a number of redundancy versions of a data block, for example differently encoded versions of the data block which can be combined together in accordance with Type-II HARQ. Plural TTI bundles can be transmitted as necessary in accordance with HARQ, for example in response to a NACK. The present technology involves adjusting the TTI bundle size for a given HARQ process, wherein at least two TTI bundles have different sizes. In various embodiments, the TTI bundle size progressively decreases with retransmissions so that the last TTI bundle is not excessively large, thereby reducing resource waste. TTI bundle size adjustment may be implemented in the uplink, downlink, or both.

25 Claims, 3 Drawing Sheets

(56) References Cited

OTHER PUBLICATIONS

TSG RAN meeting #57, RP-121441 "Updated SID on: Provision of Low-Cost MTC UEs based on LTE" Sep. 2012, Chicago, USA.

3GP TR 22.868 V8.0.0 "Updated SIF: Provision of Low-Cost MTC UEs based on LTE," 3rd Generation Partnership Project, Mar. 2007.

Yang et al., "Adaptive Transmission of VoIP Packets Using TTI Bundling in LTE Uplink," IEEE, Mar. 2014.

* cited by examiner

METHOD AND DEVICE ENABLING A DYNAMIC BUNDLE SIZE HARQ MECHANISM

FIELD OF THE TECHNOLOGY

The present technology pertains in general to wireless communication systems operating according to standards such as the Long Term Evolution (LTE), and in particular to wireless communication systems employing hybrid automatic repeat request (HARQ) mechanisms and transmit time interval (TTI) bundling.

BACKGROUND

The LTE protocol currently being developed and implemented provides a high-speed wireless communication network for use by devices such as mobile phones and data terminals. The LTE protocol itself is detailed in various documents, for example as published by the $3^{rd}$ Generation Partnership Project (3GPP).

HARQ processes proposed for LTE transmit blocks of data along with error detection and forward error correction (FEC) bits. In incremental redundancy HARQ, if the errors in a received data block cannot be corrected, the transmitter is informed via Negative Acknowledgement (NACK) and the data block is retransmitted. The retransmission is coded differently from the previous transmissions and retransmissions of the same data block; that is in accordance with a different redundancy version (RV). The receiver may then combine different redundancy versions to improve the probability of successfully decoding the data block. This type of HARQ effectively lowers the coding rate with each retransmission. HARQ effectively improves coverage, however due to signalling and processing delays, only one redundancy version can be transmitted every 8 ms.

TTI bundling has been proposed as a modification to the HARQ mechanism in order to provide improved coverage without dramatically increasing latency and signalling overhead. A detailed overview of TTI bundling can be found in "HARQ Operation in case of UL Power Limitation," Ericsson, June 2007, 3GPP TDoc R2-072630. Essentially, rather than waiting for a NACK before transmitting the next redundancy version of a data block, several redundancy versions are transmitted in consecutive transmit time intervals (TTIs). The HARQ feedback is sent after the last redundancy version of the data block is received. Current implementations specify transmission of four redundancy versions at a time. To preserve backward compatibility, further retransmission (if triggered due to a NACK) is delayed until the $16^{th}$ TTI after the first redundancy version was sent.

Increasing the TTI bundle size beyond 4 RVs is a possible way to improve coverage. For example, a 3rd Generation Partnership Project (3GPP) work item entitled "Updated SID on: Provision of low-cost MTC UEs based on LTE" (TSG RAN meeting #57, Chicago, USA, September, 2012, RP-121441), relates to a new study requiring a +20 dB improvement in coverage for LTE systems. To obtain such a +20 dB improvement through TTI bundling would require a TTI bundle size of 400 RVs.

The current implementation of TTI bundling and HARQ mechanisms of LTE is heavily influenced by the need to transmit voice conversations, for example via Voice over IP (VoIP). For these implementations, a fixed TTI bundle size is logical since there is a very limited delay tolerance and typically no time to perform more than one HARQ retransmission.

Therefore there is a need for a new data transmission mechanism.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and device enabling a dynamic bundle size HARQ mechanism. In accordance with an aspect of the present technology, there is provided a method for transmitting a block of data from a transmitter to a receiver in a wireless communication system supporting HARQ and TTI bundling, the method comprising: transmitting a TTI bundle from the transmitter to the receiver, the TTI bundle comprising a first number of redundancy versions indicative of the block of data as encoded using HARQ; and following a determination at the transmitter that transmission of the TTI bundle failed to result in successful decoding of the block of data at the receiver, transmitting a second TTI bundle from the transmitter to the receiver, the second TTI bundle comprising a second number of redundancy versions indicative of the block of data as encoded using HARQ, the second number different from the first number.

In accordance with another aspect of the present technology, there is provided a communication device in a wireless communication system supporting HARQ and TTI bundling, the communication device configured to transmit a block of data to a receiver, the communication device comprising: a transmission module configured to transmit at least a TTI bundle and a second TTI bundle from the transmitter to the receiver, the TTI bundle comprising a first number of redundancy versions indicative of the block of data as encoded using HARQ, the second TTI bundle comprising a second number of redundancy versions indicative of the block of data as encoded using HARQ; a monitoring module configured to determine whether transmission of the TTI bundle failed to result in successful decoding of the block of data at the receiver, wherein the transmission module is configured to transmit the second TTI bundle in response to a determination that transmission of the TTI bundle has failed to result in successful decoding of the block of data at the receiver; and a bundle size adjustment module configured to cause the second number of redundancy versions to be different from the first number of redundancy versions.

In accordance with another aspect of the present technology, there is provided a computer program product comprising a computer readable medium storing computer executable statements and instructions thereon that, when executed by a computer, perform operations for transmitting a block of data from a transmitter to a receiver in a wireless communication system supporting HARQ and TTI bundling, the operations comprising: transmitting a TTI bundle from the transmitter to the receiver, the TTI bundle comprising a first number of redundancy versions indicative of the block of data as encoded using HARQ; and following a determination at the transmitter that transmission of the TTI bundle failed to result in successful decoding of the block of data at the receiver, transmitting a second TTI bundle from the transmitter to the receiver, the second TTI bundle comprising a second number of redundancy versions indicative of the block of data as encoded using HARQ, the second number different from the first number.

BRIEF DESCRIPTION OF THE FIGURES

These and other features of the technology will become more apparent in the following detailed description in which reference is made to the appended drawings.

DETAILED DESCRIPTION

Definitions

Figure 1:
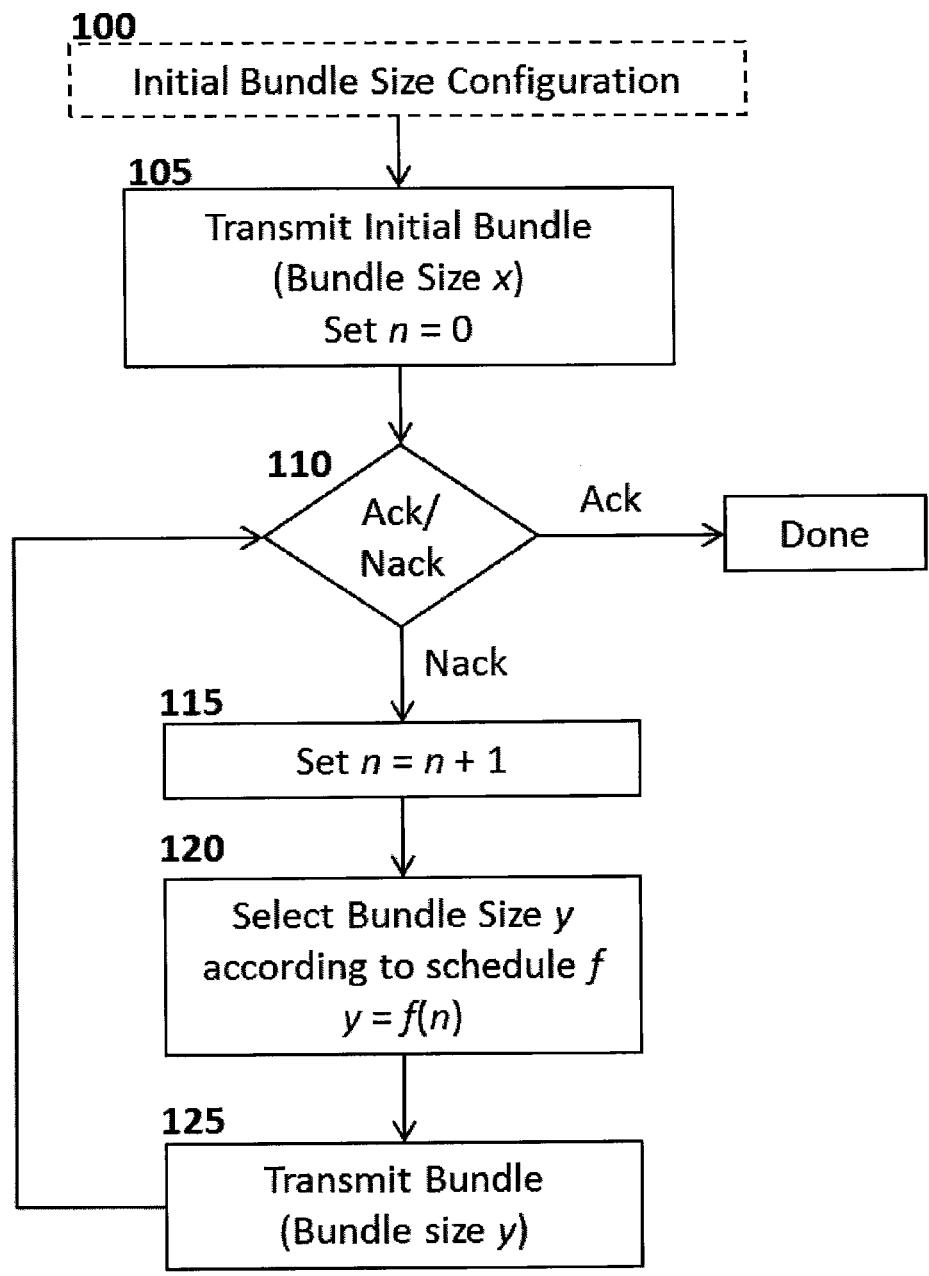
FIG. 1 illustrates a method for transmitting data, in accordance with embodiments of the present technology.

As used herein, a machine-to-machine (M2M) terminal or user equipment refers to a wireless communication terminal linked to an automated device, such as a smart meter, environmental monitor, medical patient monitor, traffic monitoring and/or control device, or other automated equipment. M2M terminals are typically distinguished from human-to-human terminals, and are typically subjected to different communication demands. An M2M terminal may also be known as a machine-type-communication (MTC) terminal. An example study on M2M communications is presented in "3rd Generation Partnership Project; Technical Specification Group Services and System Aspects; Study on Facilitating Machine to Machine Communication in 3GPP Systems; (Release 8)," $3^{rd}$ Generation Partnership Project, 3GPP TR 22.868 V8.0.0, March, 2007.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

It is recognized by the inventors that a fixed TTI bundle size can lead to inefficient use of network resources. For example, if a TTI bundle of x (e.g. 400) redundancy versions were corrupted to the point where a retransmission is required, a NACK would trigger retransmission of another TTI bundle of x additional redundancy versions. However, it might be that fewer redundancy versions (as few as one) would have been sufficient for successful decoding, when combined with prior redundancy versions, for example using soft combining. The additional, unnecessary redundancy versions sent via the retransmission therefore represent a waste of resources.

Aspects of the present technology provide a method, device and computer program product for dynamically adjusting a TTI bundle size in response to data retransmission requests. Retransmission requests may be triggered by operation of a HARQ process operating within an LTE system, for example. Typically, the HARQ process is a Type-II HARQ process, as would be readily understood by a worker skilled in the art.

In accordance with an aspect of the present technology, there is provided a method for transmitting a block of data from a transmitter to a receiver in a wireless communication system supporting HARQ and TTI bundling, such as an LTE system. The method comprises transmitting a TTI bundle from the transmitter to the receiver. This TTI bundle may correspond to a first transmission of the data block or to a subsequent transmission of the data block. TTI bundling as part of a HARQ process may be implemented generally as would be understood by a worker skilled in the art, except for configuration of the bundle size, which is as described herein. The TTI bundle comprises a first number of redundancy versions indicative of the block of data as encoded using HARQ. Following a determination at the transmitter that transmission of the TTI bundle failed to result in successful decoding of the block of data at the receiver, (for example due to reception of a NACK), the method comprises transmission of a second TTI bundle from the transmitter to the receiver. The second TTI bundle comprises a second number of redundancy versions indicative of the block of data as encoded using HARQ, the second number being different from the first number.

FIG. 1 illustrates a method for transmitting data, in accordance with embodiments of the present technology. Optionally, an initial bundle size is adaptively configured 100, for example based on channel quality measurements, latency requirements, or the like or a combination thereof. Alternatively, the initial bundle size may be set to a default value. The initial bundle, of a given TTI bundle size x, is generated and transmitted 105. Additionally, the retransmission counter n is initialized to zero. The transmitter then monitors 110 for an acknowledgement or negative acknowledgement. If a negative acknowledgement (NACK) is received, the retransmission counter is incremented 115, and a new TTI bundle size y is selected 120 according to a given procedure, represented as a function $f$. The schedule $f$ determines the current TTI bundles size y to be used based at least in part on the current value of the retransmission counter n. The new TTI bundle of size y is then generated and transmitted 125. Subsequently, the process repeats from step 110 until an acknowledgement is received, a maximum number of retransmissions is reached, or the like.

Not illustrated in FIG. 1 are various operations such as segmenting data into blocks, encoding data blocks, generating redundancy versions indicative of the encoded data blocks, inclusion of error detection and forward error correction bits in the redundancy versions, interleaving of multiple HARQ processes, restriction of the HARQ process to a maximum number of retries, scheduling operations, and the like. Further operations of the receiver, such as decoding, soft combining, ACK/NACK generation, and the like, have also been omitted but may be implemented as would be readily understood by a worker skilled in the art. These operations have been omitted for clarity, and such operations may be executed as prescribed by the appropriate standards and/or configuration settings, as would be readily understood by a worker skilled in the art.

Figure 2:
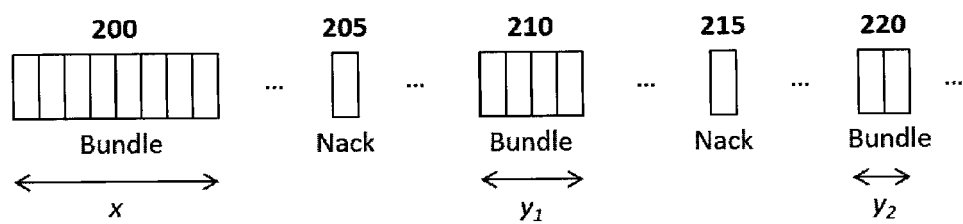
FIG. 2 illustrates transmission and retransmission of different TTI bundle sizes corresponding to a single HARQ process, in accordance with embodiments of the present technology.

FIG. 2 illustrates transmission of three successive TTI bundles 200, 210, 220, for conveying a single data block according to embodiments of the present technology. Each TTI bundle carries a plurality of redundancy versions indicative of the data block, with each bundle having a smaller bundle size than the previous bundle. The second bundle 210 is transmitted after a NACK 205 is received, and the third bundle 220 is transmitted after a second NACK 215 is received. Delays between receiving a NACK and transmitting a bundle may be due to backward compatibility requirements, for example. The determination of the bundle sizes x, $y_1$ and $y_2$ redundancy versions can be determined in a number of different ways. Examples of methods for the determination thereof are defined herein.

In accordance with another aspect of the present technology, there is provided a communication device in a wireless communication system supporting HARQ and TTI bundling. The communication device may be a wireless terminal or a base station, such as an evolved NodeB (eNB). The communication device is generally configured to transmit a block of data to a receiver, for example in accordance with the LTE protocol. The communication device comprises a transmission module configured to transmit at least a TTI bundle and a second TTI bundle from the transmitter to the receiver. The TTI bundle comprises a first number of redundancy versions indicative of the block of data as encoded using HARQ. The second TTI bundle comprises a second number of redundancy versions indicative of the block of data as encoded using HARQ. The communication device further comprises a monitoring module configured to determine whether transmission of the TTI bundle failed to result in successful decoding of the block of data at the receiver. The transmission module is configured to transmit the second TTI bundle in response to a determination that transmission of the TTI bundle has failed to result in successful decoding of the block of data at the receiver. The communication device further comprises a bundle size adjustment module configured to cause the second number of redundancy versions to be different from the first number of redundancy versions.

Figure 3:
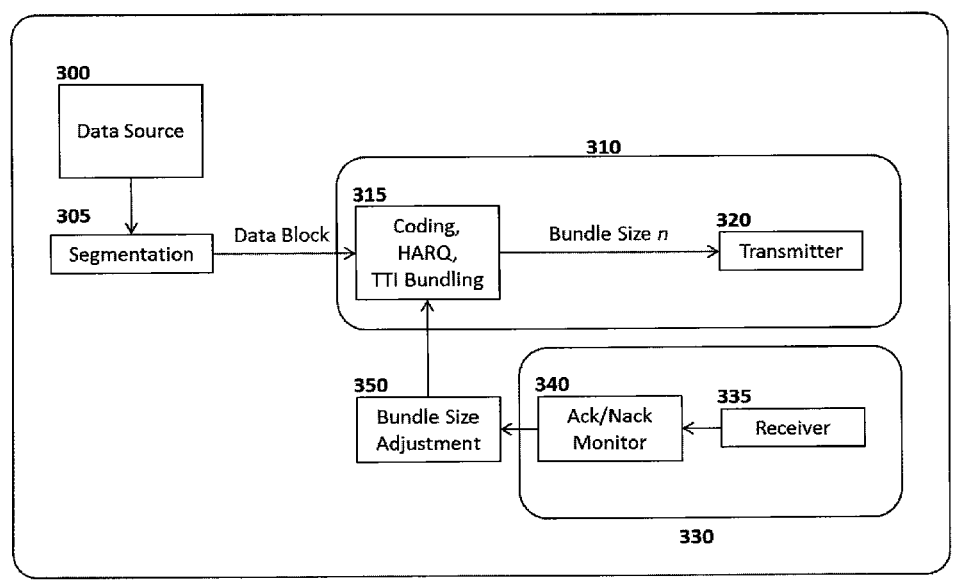
FIG. 3 illustrates a communication device, in accordance with embodiments of the present technology.

FIG. 3 illustrates a communication device configured in accordance with embodiments of the present technology. The device comprises a data source 300 which produces data blocks for transmission, for example via a segmentation process 305. The device further comprises a transmission module 310 which is configured to wirelessly transmit the data blocks, including retransmission as necessary. The transmission module is configured to implement coding, HARQ, and TTI bundling 315. Coding may include generation of plural redundancy versions indicative of the data block, addition of error detection (ED) bits, addition of forward error correction (FEC) bits, or the like or a combination thereof. Each redundancy version is indicative of the data block encoded in a different manner, such that the redundancy versions can be combined for decoding, as would be readily understood by a worker skilled in the art. The transmission module further comprises a wireless transmitter 320 configured to transmit bundles of n redundancy versions, for example in accordance with the LTE protocol. The device further comprises a monitoring module 330 comprising a wireless receiver 335 and an ACK/NACK monitor 340 which detects acknowledgements and/or negative acknowledgements corresponding to HARQ processes. The device further comprises a bundle size adjustment module 350 which is configured to receive negative acknowledgements from the monitoring module 330, determine a corresponding HARQ process related to the received negative acknowledgements, and cause the TTI bundle size associated with that HARQ process to be adjusted in accordance with a schedule. The adjusted bundle size is used by the transmission module 310 for the next HARQ retry for that HARQ process.

In some embodiments, a TTI bundle size of x Redundancy Versions (RVs) is used for initial transmission of a data block, such as a transport block. If retransmission is required, an adjusted TTI bundle size of $y_1$ RVs is used for the first batch of retransmissions of the data block. In various embodiments, $y_1$ is constrained to be less than x. For example, y, may be equal to x/2 where x is even.

In some embodiments, further adjusted TTI bundle sizes may be used for further retransmissions of the data block, if required. For example, an adjusted TTI bundle size of $y_n$ RVs may be used for the $n^{th}$ batch of retransmissions, where $y_n$ is less than or equal to $y_{n-1}$. For example, $y_1$ may be equal to x/2, $y_2$ may be equal to $y_1/2$, $y_3$ may be equal to $y_2/2$, and $y_n$ may be equal to $y_3$ for n>3. If the calculated $y_n$ is not an integer, it may be adjusted up or down to an integer value.

In various embodiments, a minimum TTI bundle size may be defined. For example $y_3$ is the minimum TTI bundle size in the above embodiment. A minimum bundle size may be implemented so as to limit the number of potential HARQ cycles. This may be desirable for example if the initial TTI bundle size setting is inappropriate (for example associated with a small probability of successful transmission). This may occur for example if the initial coverage or channel condition estimates are inaccurate.

More generally, in various embodiments, a TTI bundle size of x RVs is used for initial transmission of a data block, such as a transport block. If retransmission is required, at least one of the retransmissions uses a TTI bundle size which is different from x, for example smaller than x. Thus, the first $k_1$ retransmissions may use a TTI bundle size of x RVs, while the $k_1+1^{st}$ retransmission may use an adjusted bundle size of $y_1$ RVs, where $y_1<x$. The value $k_1$ may be set to 0, 1, 2, or the like. Further adjustments are possible for subsequent retransmissions. For example, the next $k_2$ retransmissions may use a TTI bundle size of $y_1$ RVs, while the $k_2+1^{st}$ retransmission may use an adjusted bundle size of $y_2$ RVs. Other TTI bundle size adjustment functions may be implemented, for example such that the TTI bundle size is decreased in accordance with a predetermined schedule, with a decrease occurring for at least one retransmission event.

Various bundle size adjustment schedules may be utilized. For example, as described above, the TTI bundle size may be approximately halved at each retransmission (HARQ retry) until a minimum value is reached, or the TTI bundle size may be decreased (e.g. halved) at specific retransmission attempts, but otherwise maintained at its previous value. As another example, the TTI bundle size may be reduced to one RV at the first retransmission attempt, or at a subsequent retransmission attempt, thereby essentially disabling TTI bundling for subsequent retransmissions. In various embodiments, the bundle size adjustment schedule may be encoded as an algorithm, for example which returns a current TTI bundle size for use in response to an input such as the number of HARQ retries previously performed.

In various embodiments, the bundle size adjustment schedule causes the TTI bundle size to decrease over time. In various embodiments the decrease is monotone, i.e. the TTI bundle size either decreases or stays the same at every HARQ retry. In embodiments, the decrease may be an average decrease over time, such that some increases may be allowed.

According to embodiments, the bundle size adjustment schedule causes the TTI bundle size to increase over time, either monotonically, on average, or the like. The increase may be temporary or indefinite. This may be advantageous in certain situations. For example, if data latency requirements dictate that a certain data block should be received before a given deadline, the TTI bundle size may be increased immediately prior to the deadline to increase the probability of timely delivery. The TTI bundle size may generally decrease over time as described above, except immediately prior to such latency cut-offs. Increases in TTI bundle size may lead to inefficient use of resources if more RVs are transmitted than required. Hence increases in the TTI bundle size may be restricted to certain situations.

Selection of an appropriate bundle size adjustment schedule may be made based on a variety of considerations. For example, a bundle size adjustment schedule which reduces the bundle size more rapidly is less likely to waste resources, but more likely to require additional HARQ retries. Conversely, a bundle size adjustment schedule which reduces the bundle size more slowly is more likely to waste resources, but less likely to require additional HARQ retries. An appropriate bundle size adjustment schedule may depend on many factors, for example latency requirements, channel estimate accuracy and estimation error probabilities, and the like.

In some embodiments, the device may be configured to adaptively derive a bundle size adjustment schedule, for example based on machine learning, feedback control, or the like. However, adaptation may be made slow in order to ensure that the adaptive procedure does not use excessive overhead. Furthermore, in various embodiments it is required that transmitters and receivers use the same bundle size adjustment schedule.

In various embodiments, the current bundle size adjustment schedule is made known a priori to both transmitters and receivers. In some embodiments, the bundle size adjustment schedule may be fixed and known to all transmitters and receivers. Knowing the bundle size adjustment schedule adjustment schedule a priori can avoid the need for extra signalling to inform receivers of the next TTI bundle size to be used in the HARQ process.

It is noted that retransmissions may not occur indefinitely. For example the current LTE standard allows for a maximum of 28 HARQ retries. In some embodiments, the bundle size adjustment schedule may be configured at least partly based on a predetermined maximum number of HARQ retries, a predetermined maximum number of RVs which are allowed to be transmitted, or a combination thereof.

In various embodiments, TTI bundling and dynamic bundle size adjustment may be implemented by wireless terminals (UEs) transmitting uplink data to a base station such as an eNB. For LTE systems, synchronous HARQ may be implemented for the uplink. That is, the eNB has a priori information regarding which HARQ process and RV the UE will transmit.

In various embodiments, TTI bundling and dynamic bundle size adjustment may be implemented by base stations (eNBs) transmitting downlink data to a wireless subscriber terminal. For LTE systems, asynchronous HARQ may be implemented for the downlink. That is, the receiver does not have a priori information regarding which HARQ process is being transmitted, or when transmission is scheduled to occur. Therefore the HARQ process identifier and the RV information are sent along with the data. The RV information specifies the combination of data, ED bits, and FEC bits is being transmitted. The RV information may be transmitted on a physical downlink control channel (PDCCH) concurrently with transmission of the HARQ process on the physical downlink shared channel (PDSCH).

It is noted that, since multiple parallel HARQ process may be implemented in certain systems, such as LTE systems, some or all of these HARQ processes may be configured to use TTI bundling with dynamic bundle size adjustment, as described herein.

In some embodiments, rather than proceeding according to a predetermined TTI bundle size adjustment schedule known a priori to both transmitter and receiver, the receiver may be configured to select the next bundle size dynamically, for example based on channel quality measurements, latency requirements, or the like or a combination thereof The receiver may then embed an indication of the next TTI bundle size to be used for the current HARQ process within a NACK message which is sent to the transmitter. In this manner, the next TTI bundle size will be known to both transmitter and receiver, but it can be dynamically adjusted. For example, in some embodiments if the channel quality measurement is low, the TTI bundle size may be configured to increase in size as an attempt to provide a better possibility of decoding. As another example, if the latency is high, the TTI bundle size may be configured to decrease in size as an attempt to get the information to the destination within a desired time interval. In addition, should both channel quality measurement and latency be considered for the TTI bundle size determination, a relative weighting of these effects of these channel characteristics may be necessary in order to determine the subsequent TTI bundle size.

Initial TTI Bundle Size

In some embodiments, the initial TTI bundle size may be fixed globally to a predetermined value. In some embodiments, the initial TTI bundle size may be determined by an adaptive mechanism. For example, the adaptive mechanism may select an initial TTI bundle size based on an estimate of channel conditions, for example derived from Channel Quality Indication (CQI) measurements, power control settings, and the like. If the initial TTI bundle size is too low, a HARQ retry will be triggered with high probability. If the initial TTI bundle size is too high, resources will have been wasted. The bundle size adjustment schedule may be defined based on the initial TTI bundle size, and hence will be known to transmitter and receiver once the initial TTI bundle size is known.

In some embodiments, where latency requirements are not strict, for example in the case of M2M data communication, the adaptive mechanism for selecting an initial TTI bundle size is biased toward selecting a lower initial TTI bundle size. Thus, there will be a higher probability that at least one HARQ retry will be required. In some embodiments, the amount of bias toward selecting a lower initial TTI bundle size may be adjusted based on given latency requirements. Latency requirements may be stored in the home subscriber service (HSS) or home location register (HLR) along with the wireless device's subscription data, and provided to the eNB as required. Alternatively, latency requirements may be provided by the wireless device or Policy Control and Charging (PCC) entity when the bearer is set up.

In some embodiments, the initial TTI bundle size is large relative to that dictated by the current LTE standard. In some embodiments, the TTI bundle size is equal to or greater than 10. In some embodiments, the TTI bundle size is equal to or greater than 50. In some embodiments, the TTI bundle size is equal to or greater than 100. In some embodiments, the TTI bundle size is equal to or greater than 400.

Various embodiments of the present technology relate to a device or system of devices. A device may take the form of a communication device in a wireless communication system supporting HARQ and TTI bundling, such as an LTE wireless communication system. In some embodiments, the communication device is a wireless subscriber terminal, such as user equipment (UE), handheld cell phone, personal digital assistant (PDA), machine-to-machine (M2M) device, or the like. In some embodiments, the communication device is a base station, such as an eNB or the like.

Typically, the transmitting apparatus is configured to adjust the bundle size in accordance with a given bundle size adjustment schedule, while the receiving apparatus may concurrently be aware of the same bundle size adjustment schedule. This allows the receiving device to anticipate the next bundle size and process received data appropriately, for example to combine different redundancy versions within the bundle in an attempt to decode the data block.

As will be readily understood by a worker skilled in the art, a communication device may comprise various structural elements, such as a power source, microprocessor, memory, signal processing section, radiofrequency (RF) electronics section, antenna, and the like. In various embodiments, an existing communication device, such as a user equipment (UE), M2M device, eNB, or the like, which is configured to operate in a wireless communication system such as an LTE system, may be further configured to perform adaptive TTI bundle size adjustment in accordance with the present technology. Such configuration may be via new software routines loaded into memory of the device and used to guide operation thereof, or similarly via new firmware routines loaded into memory for use by appropriate components such as a microcontroller or digital signal processor. Additionally or alternatively, configuration may be performed by incorporating appropriate specialized hardware, such as electronic components, microcontrollers, logic arrays, signal processing electronics, or the like, into the device. A worker skilled in the art would understand how to adjust operation of an existing communication device or to create a new communication device having the desired operating characteristics as described herein.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

I claim:

1. A method for transmitting a block of data from a transmitter to a receiver in a wireless communication system supporting HARQ and TTI bundling, the method comprising:
    a) transmitting a TTI bundle from the transmitter to the receiver, the TTI bundle comprising a first number of redundancy versions indicative of the block of data as encoded using HARQ; and
    b) following a determination at the transmitter that transmission of the TTI bundle failed to result in successful decoding of the block of data at the receiver, transmitting a second TTI bundle from the transmitter to the receiver, the second TTI bundle comprising a second number of redundancy versions indicative of the block of data as encoded using HARQ, the second number different from the first number,
    wherein an initial size of the TTI bundle is configured based at least in part on latency requirements for transmission of the block of data, wherein determining the initial size of the TTI bundle comprises adjusting the initial size of the TTI bundle downward when the latency requirements are reduced.

2. The method according to claim 1, wherein the second number of redundancy versions is less than the first number of redundancy versions.

3. The method according to claim 1, wherein the second number of redundancy versions is about half of the first number of redundancy versions.

4. The method according to claim 1, wherein the number of redundancy versions in successive TTI bundles is adjusted over time in accordance with a bundle size adjustment schedule.

5. The method according to claim 1, wherein the TTI bundle size is caused to decrease monotonically over time in accordance with a bundle size adjustment schedule.

6. The method according to claim 1, wherein the TTI bundle corresponds to an initial attempt to transmit the data block or a subsequent attempt to transmit the data block.

7. The method according to claim 1, further comprising following a determination at the transmitter that transmission of the second TTI bundle failed to result in successful decoding of the block of data at the receiver, transmitting a third TTI bundle from the transmitter to the receiver, the third TTI bundle comprising a third number of redundancy versions indicative of the block of data as encoded using HARQ, the third number different from the first number, the second number, or both.

8. The method according to claim 1, wherein a bundle size adjustment schedule is based at least in part on channel quality measurements, latency requirements, or both.

9. A communication device in a wireless communication system supporting HARQ and TTI bundling, the communication device configured to transmit a block of data to a receiver, the communication device comprising:
    a) a transmission module configured to transmit at least a TTI bundle and a second TTI bundle from the transmitter to the receiver, the TTI bundle comprising a first number of redundancy versions indicative of the block of data as encoded using HARQ, the second TTI bundle comprising a second number of redundancy versions indicative of the block of data as encoded using HARQ;
    b) a monitoring module configured to determine whether transmission of the TTI bundle failed to result in successful decoding of the block of data at the receiver, wherein the transmission module is configured to transmit the second TTI bundle in response to a determination that transmission of the TTI bundle has failed to result in successful decoding of the block of data at the receiver; and c) a bundle size adjustment module configured to cause the second number of redundancy versions to be different from the first number of redundancy versions, wherein an initial size of the TTI bundle is configured based at least in part on latency requirements for transmission of the block of data, wherein determining the initial size of the TTI bundle comprises adjusting the initial size of the TTI bundle downward when the latency requirements are reduced.

10. The communication device according to claim 9, wherein the communication device is a wireless subscriber terminal.

11. The communication device according to claim 9, wherein the communication device is a base station or eNB.

12. A computer program product comprising a non-transitory computer readable medium storing computer executable statements and instructions thereon that, when executed by a computer, perform operations for transmitting a block of data from a transmitter to a receiver in a wireless communication system supporting HARQ and TTI bundling, the operations comprising:

a) transmitting a TTI bundle from the transmitter to the receiver, the TTI bundle comprising a first number of redundancy versions indicative of the block of data as encoded using HARQ; and b) following a determination at the transmitter that transmission of the TTI bundle failed to result in successful decoding of the block of data at the receiver, transmitting a second TTI bundle from the transmitter to the receiver, the second TTI bundle comprising a second number of redundancy versions indicative of the block of data as encoded using HARQ, the second number different from the first number, wherein an initial size of the TTI bundle is configured based at least in part on latency requirements for transmission of the block of data, wherein determining the initial size of the TTI bundle comprises adjusting the initial size of the TTI bundle downward when the latency requirements are reduced.

13. The computer program product according to claim 12, wherein the second number of redundancy versions is less than the first number of redundancy versions.

14. The computer program product according to claim 12, wherein the second number of redundancy versions is about half of the first number of redundancy versions.

15. The computer program product according to claim 12, wherein the number of redundancy versions in successive TTI bundles is adjusted over time in accordance with a bundle size adjustment schedule.

16. The computer program product according to claim 12, wherein the TTI bundle size is caused to decrease monotonically over time in accordance with a bundle size adjustment schedule.

17. The computer program product according to claim 12, wherein the TTI bundle corresponds to an initial attempt to transmit the data block or a subsequent attempt to transmit the data block.

18. The computer program product according to claim 12, further comprising following a determination at the transmitter that transmission of the second TTI bundle failed to result in successful decoding of the block of data at the receiver, transmitting a third TTI bundle from the transmitter to the receiver, the third TTI bundle comprising a third number of redundancy versions indicative of the block of data as encoded using HARQ, the third number different from the first number, the second number, or both.

19. The computer program product according to claim 12, wherein a bundle size adjustment schedule is based at least in part on channel quality measurements, latency requirements, or both.

20. The method according to claim 1, wherein the TI bundle and the second TTI bundle convey data according to a common HARQ process.

21. The communication device according to claim 9, wherein the TTI bundle and the second TTI bundle convey data according to a common HARQ process.

22. The method of claim 1, wherein the initial size of the TTI bundle is further configured based on channel quality measurements.

23. The method of claim 1, wherein the latency requirements are provided by a home subscriber service (HSS), a home location register (HLR), a wireless subscriber device, or a Policy Control and Charging (PCC) entity.

24. The method Of claim 1, wherein the TTI bundle size is caused to change over time in accordance with a bundle size adjustment schedule, the method further comprising independently determining the bundle size adjustment schedule by the transmitter and the receiver.

25. The method of claim 1, wherein the TTI bundle size is caused to change over time in accordance with a bundle size adjustment schedule, and wherein determination of the bundle size adjustment schedule is based at least in part on the initial size of the TTI bundle.

* * * * *